United States Patent [19]

Rajaram

[11] Patent Number: 4,511,965

[45] Date of Patent: Apr. 16, 1985

[54] VIDEO RAM ACCESSING SYSTEM

[75] Inventor: Babu Rajaram, St. Joseph, Mich.

[73] Assignee: Zenith Electronics Corporation, Glenview, Ill.

[21] Appl. No.: 446,296

[22] Filed: Mar. 21, 1983

[51] Int. Cl.[3] .............................................. G06F 3/14

[52] U.S. Cl. .................................... 364/200; 340/711; 340/750; 340/703

[58] Field of Search ................ 364/200, 900; 340/728, 340/735, 725, 750, 703, 711

[56] References Cited

U.S. PATENT DOCUMENTS

| | | | |
|---|---|---|---|
| Re. 30,785 | 10/1981 | Lovercheck et al. | 364/200 |
| 4,117,469 | 9/1978 | Levine | 364/200 |
| 4,139,838 | 2/1979 | Inose et al. | 364/900 |
| 4,296,930 | 10/1981 | Frederiksen | 340/725 |
| 4,439,762 | 3/1984 | Van Vliet et al. | 340/728 |

*Primary Examiner*—Eddie P. Chan
*Assistant Examiner*—Jameson Lee

[57] ABSTRACT

A system for resolving the contention between the central processing unit (CPU) and the cathode ray tube (CRT) controller in accessing the video memory array, or video random access memory (RAM), of a data processing system is disclosed. The conventional CPU-CRT controller accessing sequence is modified to provide a CPU access period between successive CRT controller access periods. In addition, arbitration logic is included to provide CRT controller access priority when there is contention between the CPU and the CRT controller. By thus assigning video memory access priority to the CRT controller and increasing the length of the video memory array "read" time during which video information is provided to the system's display device, video display performance is enhanced and display degradation due to video memory array operating speed limitations is essentially eliminated. This approach reduces operating speed criteria of the various components in the data processing system in providing high quality display graphics and improved system operating functions without the need for highly sophisticated and expensive CPU's, RAM's, etc.

8 Claims, 5 Drawing Figures

VIDEO RAM ACCESSING SYSTEM

BACKGROUND OF THE INVENTION

The present invention relates generally to data processing systems and is specifically directed to a data processing system having a central processing unit (CPU), a video memory array and a controller for controlling the operation of a video display unit such as a cathode ray tube (CRT) as used in word processing.

The general organization of a data processing system including a video display unit for the presentation of information thereon includes a microprocessor, a memory unit, a video display controller and a bus system comprising control, address and data buses which interconnect the various elements of the system. Where the data processing system includes a cathode ray tube, the video display controller is referred to as a CRT controller which is adapted to sequentially access the memory unit for display instructions that direct what graphics are to be generated and how the graphics are to be displayed. Under the direction of these display instructions, the CRT controller executes additional memory unit accesses to obtain stored graphics information that is converted to video information of predetermined characteristics. The memory unit, which is generally referred to as the video memory array, is a random access memory (RAM) device in which digital data is stored which is red therefrom synchronously with the raster scanning of the picture elements on the face of the CRT. The CPU is responsive to user initiated inputs and is generally comprised of a microprocessor used to update or modify the digital data stored in the video memory array and hence modify the picture displayed on the CRT's screen.

In controlling those locations in the video memory array from which graphics information is read by the CRT controller and provided to the video display unit, the CPU writes information into the video memory array. In response to this information, the CRT controller provides predetermined address locations to video logic circuitry in the system for displaying the desired information. Thus, in early data processing systems, CPU operation was limited to writing information into the video memory array while CRT controller operation was limited to reading information from the video memory array.

Another, later approach for interfacing the various components of a data processing system has the CPU directly coupled only to the CRT controller. In this scheme, the CPU provides various commands to the CRT controller which, in turn, selectively accesses the video memory array in writing instructions therein and reading the appropriate digital data therefrom in generating CRT display commands. This approach requires a relatively sophisticated CRT controller capable of simultaneously processing CPU input commands and video RAM array control signals for driving the CRT.

Still another approach, gaining increasing acceptance, is known as "dual porting" wherein both the CPU and the CRT controller have access to the video RAM array with the CRT controller capable of only reading data from the video RAM array while the CPU is capable of either reading from or writing to the video RAM array. The CPU writes information to the video RAM array for accessing various of the plurality of addressable memory locations therein. The CPU may also be required to read data from the video RAM array in order to perform a specific function. For example, if the user desires to remove only a portion of the graphics display from the CRT's screen, the CPU will read the data stored in the video RAM array and provide appropriate erase commands to the video RAM array for removing selected portions of the video graphics display.

The "dual porting" approach, while affording enhanced system capabilities, places increased performance requirements upon the various components of the data processing system. For example, because of this selective accessing technique, the video RAM array must be capable of high speed read and write operations. In addition, since for the majority of time the CRT controller is accessing the video RAM array in providing a continuous display of information on the CRT's screen, the CPU must be capable of high speed accessing of the video RAM array for extremely short periods so as to avoid degradation of video display quality. Higher speed components generally drive up the cost and complexity of the data processing system. The goal, of course, is to resolve the video RAM array accessing contention between the CPU and the CRT controller using existing components, if possible, or in minimizing system cost and complexity in designing new systems.

One approach to resolving the contention between the CPU and the CRT controller in accessing the video RAM array is disclosed in reissued U.S. Pat. No. Re. 30,785 to Lovercheck, et al., wherein is described a microcomputer terminal system having a first set of shift registers receiving character data from a memory for the input/output devices and a second set of shift registers receiving character data from the first set of shift registers for providing this character data to a character generator for displaying data on the screen of a CRT. When the second set of shift registers advances character data to the CRT, the first set of shift registers receives the character data to be displayed in the succeeding row on the CRT. The first set of shift registers can thus delay loading of the character data from the memory to the first set of shift registers in providing access priority to the system's microprocessor. Thus, the microprocessor can operate at its own rate and obtain priority over the use of the system bus without interrupting the screen refresh cycle or the CRT display.

Another approach is described in U.S. Pat. No. 4,298,931 to Tachiuchi, et al., wherein a plurality of character store RAMs are accessible by a CPU and display timing signal generation means for the simultaneous access and operation of these RAMs. During one character display time a first character store RAM is subjected to a read/write operation by the CPU. At this time, a second character store RAM is subjected to a read operation by a display timing signal from the display timing signal means and a third character store RAM is refreshed. These concurrent operations of the three RAMs are sequentially switched for each character display time permitting the CRT to display characters at all times.

The present invention is intended to provide for the high speed accessing of the video RAM array by the system's CPU while still affording extended periods of video data transfer from the video RAM array to the system's video display in accordance with instructions provided to a video display controller. Thus, high quality graphics is available without the need for multiple RAM arrays, high speed and expensive components and complicated data shifting schemes.

OBJECTS OF THE INVENTION

Accordingly, it is an object of the present invention to provide improved video graphics display in a data processing system.

It is another object of the present invention to provide improved graphics in a microprocessor controlled video display system by ensuring video display controller priority while providing for other access modes of video memory array operation on a limited, as required basis.

Still another object of the present invention is to provide improved accessing control of the video memory array in a data processing system between the system's central processing unit and CRT controller for enhanced video display operation.

A further object of the present invention is to improve the video display of information in a data processing system without using expensive and sophisticated components by controlling the operation and interoperation of existing components in a more efficient, novel manner.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
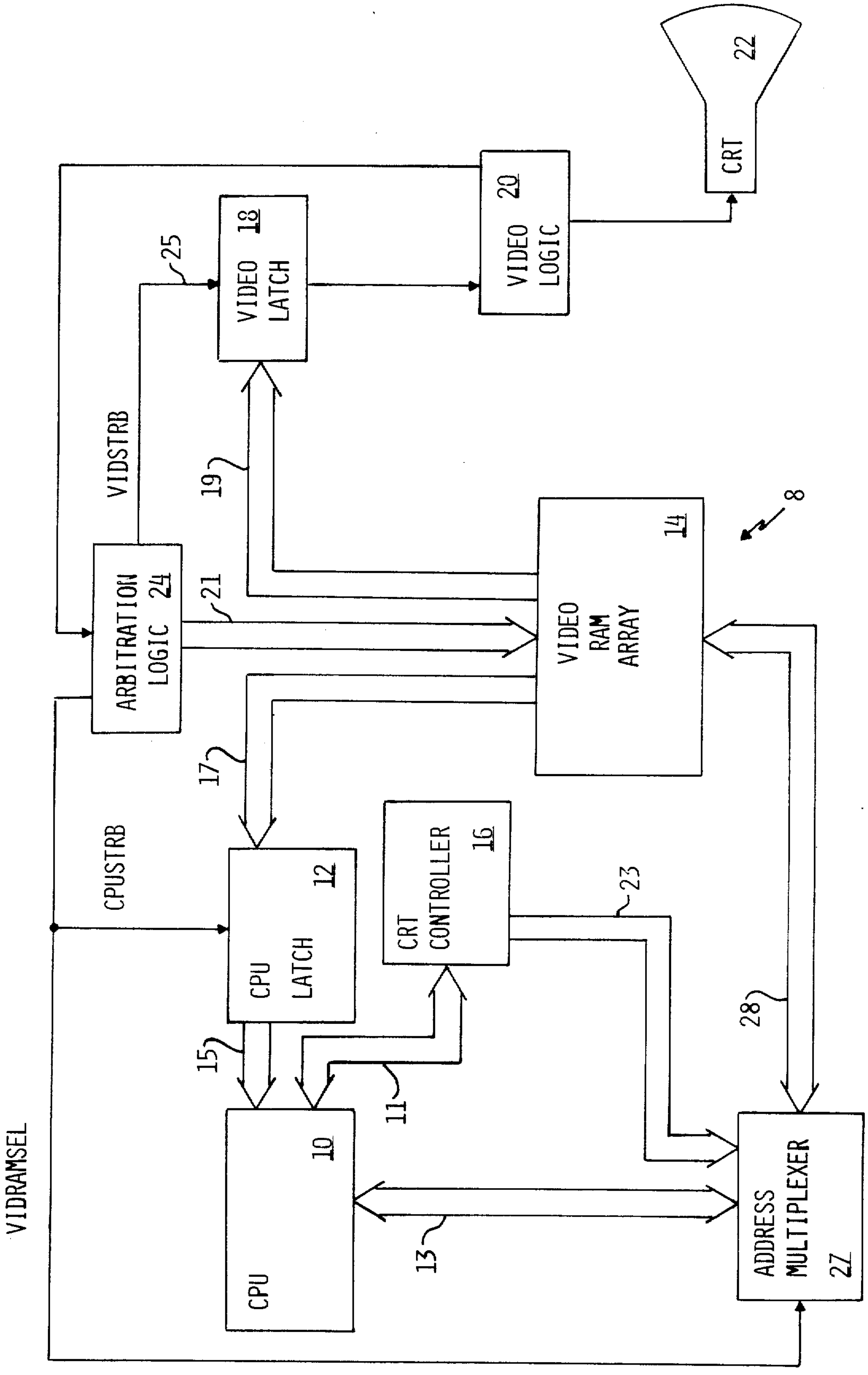
FIG. 1 is a simplified block diagram of a video RAM accessing system in accordance with the present invention.

Referring to FIG. 1, there is shown in simplified block diagram form a video RAM accessing system 8 in accordance with the present invention. User initiated inputs are provided to a central processing unit (CPU) 10 by means of a conventional input device such as a keyboard (not shown). The microprocessor utilized in a preferred embodiment of the present invention is the 8-bit HMOS 8088 microprocessor available from Intel Corporation of Santa Clara, Calif. This microprocessor includes an 8-bit data bus interface which can address up to a maximum of 1 megabyte of memory. The 8088 microprocessor is conventional in design and operation and thus representative of the typical 8-bit microprocessor currently available. However, the present invention is not limited in its application to the use of the 8088 microprocessor, nor is it limited in operation to an 8-bit microprocessor, but will operate equally well with any conventional microprocessor regardless of word length.

CPU 10 is coupled to a video RAM array 14 via data bus 13, address multiplexer 27 and address bus 28. CPU 10 is capable of either writing data into or reading data from the video RAM array. Similarly, a CRT controller 16 is coupled to the video RAM array 14 via a CRT controller address bus 23, address multiplexer 27 and address bus 28. Unlike CPU 10, CRT controller 16 is only capable of providing addresses to the video RAM array 14 so that video information cna be read from it. Address multiplexer unit 27 is connected also to the arbitration logic unit 24 and is responsive to a VIDRAMSEL signal output therefrom for performing a switch function in selectively coupling either CPU 10 or CRT controller 16 to the video RAM array 14 in accordance with the VIDRAMSEL signal. The manner in which the VIDRAMSEL signal is generated is described in detail below.

The video RAM array 14 utilized in a preferred embodiment of the present invention is a "half good" 64K random access memory (RAM). This type of RAM is generally inexpensive since it possesses something less than 64K memory capacity and is readily available at slower operating speeds. The CRT controller 16 provides address information into the video RAM array 14, with the contents thereof then provided via data OUT bus 19 to a video latch 18. Similarly, the contents of the video RAM array 14 may be selectively provided via data OUT bus 17 to a CPU latch 12 in accordance with control instructions provided to the video RAM array 14 by CPU 10 and arbitration logic 24. In this manner, the contents of the video RAM array 14 may be read by the CPU 10 via the data OUT bus 17, CPU latch 12 and a CPU data IN bus 15. The CPU 10 may then, after reading the data contents of the video RAM array 14, make system control decisions in accordance with program instructions stored therein.

CPU latch 12 and video latch 18 are 8-bit latches and provide parallel in-parallel out processing of the bits in converting the stored contents of the video RAM array 14 into a signal form representing the actual dots, or pixels, on the face of a CRT 22 for the selective illumination thereof in displaying video information thereon. The parallel output of the video latch 18 is provided to conventional video logic circuitry 20 where it is converted to a serial bit stream with the help of shift registers (not shown), which information is provided to the CRT 22 in synchronism with the raster scanning thereof.

A bi-directional data/control bus 11 couples the CPU 10 with the CRT controller 16. Thus, under the direction of CPU 10, the CRT controller 16 selectively reads the contents of the video RAM array 14 in providing appropriate data inputs via the data OUT bus 19 to the combination of video latch 18 and video logic 20 in driving the CRT 22.

The CRT controller 16 utilized in a preferred embodiment of the present invention is the HD6845 CRT controller available from Hitachi America, Ltd. In selectively reading the contents of the video RAM array 14 under the control of the CPU 10, the CRT controller 16 provides for the appropriate 8-bit output signals to the video latch 18 via the data OUT bus 19. The CRT controller 16 continuously updates the CRT's screen 60 times per second based upon the contents of the addressed locations in the video RAM array 14. The CRT controller 16 generates a video RAM address signal and reads a byte representing 8 pixels on the CRT's screen from the video RAM array 14. Once these pixels are displayed, the CRT controller 16 automatically, depending upon its initialization parameters, advances to the next byte describing the next group of pixels with this process continuing without interruption.

The control/data signals transmitted via CPU data/control bus 11 connecting the CPU 10 and the CRT controller 16 specify such system parameters as CRT type, lines per screen to be displayed on the CRT, characters per line and interrupt generation during the vertical sync interval. From FIG. 1, it can be seen that control and data signals are provided between the video RAM array 14 and both the CPU 10 and the CRT controller 16.

Thus, as shown in FIG. 1, the video RAM array 14 is accessed by both the CPU 10 and the CRT controller 16. Ideally, CRT controller 16 access to the video RAM array 14 would be maximized to provide the best possible display on the screen of the CRT, while CPU access to the video RAM array would be minimized so as not to degrade the performance of the video display. This requires short CPU-video RAM array access times which are possible only by using sophisticated, expensive integrated circuits. The present invention is intended to control CPU-video RAM array access times so that even when microprocessor and memory chips having relatively slow operating speeds are utilized, video display performance is not degraded even during periods of frequent CPU access of the video RAM array such as in the scrolling, or sequential vertical displacement, of the information displayed on the CRT 22.

The selective accessing of the video RAM array 14 by the CRT controller 16 and the CPU 10 in the present invention is controlled by arbitration logic circuitry 24. This arbitration logic 24 transmits various control signals to the video RAM array 14 and the CPU and video latches 12, 18 to provide substantially greater CRT controller accessing time of the video RAM array than that provided to the CPU. In addition, the arbitration logic 24 resolves the contention which arises from simultaneous attempts by the CPU and the CRT controller to access the video RAM array by granting access priority to the CRT controller, relegating the CPU to a standby status until the occurrence of its next regularly scheduled access interval. The manner in which the arbitration logic 24 accomplishes these tasks is described in the following paragraphs.

Figure 2:
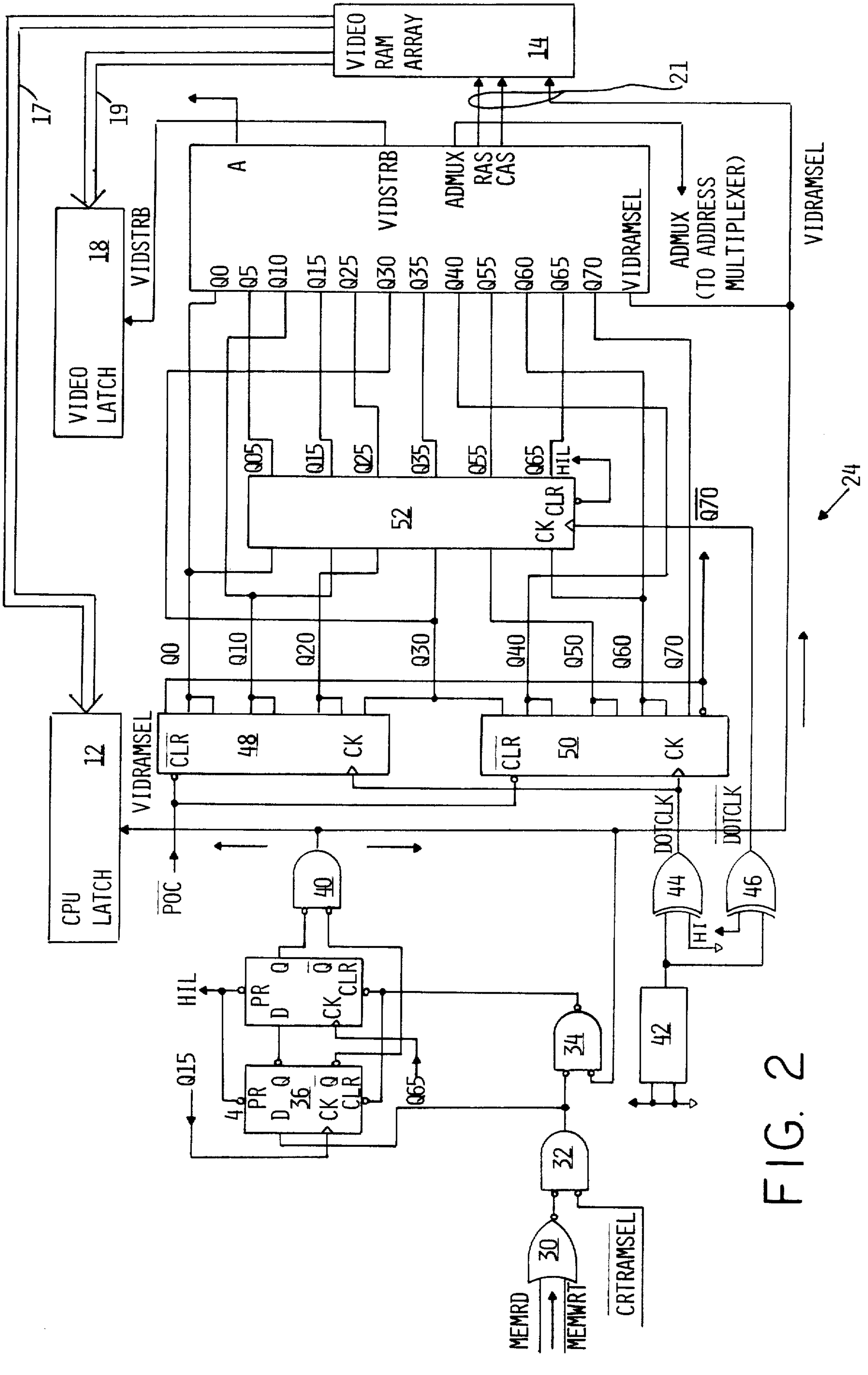
FIG. 2 is a combination logic diagram and block diagram of part of the video RAM accessing system of FIG. 1 particularly related to the arbitration logic utilized therein in controlling video RAM access.

Referring to FIG. 2, there is shown a combination schematic and block diagram of the arbitration logic circuitry 24 utilized in a preferred embodiment of the present invention. Three input signals are provided to the arbitration logic 24: a video RAM "read" signal (MEMRD), a video RAM array "write" signals (MEMWRT), and a CRT video RAM array select signal ($\overline{\text{CRTRAMSEL}}$). The MEMRD signal indicates that the video RAM array 14 is in a data read cycle wherein information is provided to CPU 10 via the data OUT bus 17 by the video RAM array 14. The MEMWRT input signal indicates that the video RAM array 14 is in a write cycle wherein the contents thereof may be provided by the CPU 10. The $\overline{\text{CRTRAMSEL}}$ signal indicates to the arbitration logic 24 that the CPU 10 seeks access to the video RAM array 14. These three signals are provided to the arbitration logic circuitry 24. These signals are typically generated in a data processing system having a video display and may be generated by conventional means in the present invention. For example, control logic (not shown) may generate and provide the $\overline{\text{CRTRAMSEL}}$ signal to the arbitration logic 24 by monitoring a predetermined address location in the video RAM array 14 and outputting a signal when that particular location is being addressed by the CPU 10. By thus providing the three aforementioned signals to the arbitration logic 24, information regarding the operating status of the video RAM array 14 and whether or not the CPU 10 desires access to the video RAM array is generated in the present invention.

As shown in FIG. 2, the MEMRD and MEMWRT signals are provided to the two inputs of a NOR gate 30. The presence of either of these positive inputs to NOR gate 30 will result in an inverted output therefrom which is provided to one input of an active low AND gate 32. To the other input of the active low AND gate 32 is provided the $\overline{\text{CRTRAMSEL}}$ signal such that an output will be generated by AND gate 32 only if two inverted inputs are provided thereto. Thus, an output from the active low AND gate indicates that CPU 10 is seeking access to the video RAM array 14. The output of active low AND gate 32 is provided directly to D-type flip-flop 36 and indirectly via active low NAND gate 34 to D-type flip-flop 38. Timing inputs Q15 and Q65 are provided to the clock inputs of flip-flops 36, 38, respectively. These timing signals are generated in a later stage of the arbitration logic 24, as will be described presently.

The outputs of flip-flops 36, 38 are coupled to the input terminals of an active low AND gate 40 such that the output of flip-flop 36 initiates a positive-going output pulse from the active low AND gate 40, while the transition of the Q output of flip-flop 38 to a noninverted state terminates the output signal from active low AND gate 40. The output signal from active low AND gate 40 is termed the VIDRAMSEL signal. The VIDRAMSEL signal in a high state represents that the CPU 10 seeks access to the video RAM array 14 and that arbitration logic 24 has granted access priority to CPU 10. Similarly, if the VIDRAMSEL signal is low, video RAM ray access is maintained by the CRT controller 16. The VIDRAMSEL signal is provided back to one input of the active low NAND gate 34 in a feedback arrangement such that the transition to a noninverted state of one of the inputs thereof clears the flip-flops 36, 38, which are then reset in order to detect a subsequent $\overline{\text{CRTRAMSEL}}$ signal input.

An oscillator circuit 42, operating at 14.112 MHz in a preferred embodiment of the present invention, provides one input to each of the exclusive OR gates 44, 46. The oscillator circuit 42 performs the function of a dot clock in selectively turning on the electron beam of the CRT and illuminating predetermined dots, or pixels, on the CRT's screen. The oscillator circuit 42 thus provides timing input signals to exclusive OR gate 44, the other input to which is grounded, and to exclusive OR gate 46, the other input to which is pulled high, in generating respectively a noninverted clock signal (DOTCLK) and an inverted clock signal ($\overline{\text{DOTCLK}}$). This arrangement provides for minimum skew between the two aforementioned clock signals. The noninverted clock signal is provided to the clock inputs of two quad registers 48, 50, each having a plurality of D-type flip-flops. The inverted clock signal is provided to the clock input of a hex flip-flop 52 which is clocked by the alternate, or negative-going, edge of the clock signal. The inverted and noninverted clock signals of the oscillator circuit 42 are utilized to provide edge timing for concatenating two character clocking periods into a single, longer timing interval for reasons explained below.

The eight output signals of the quad registers 48, 50 are thus clocked by the positive-going edge of the clock signal generated by oscillator circuit 42. Six of these output signals are provided as inputs to the hex flip-flop 52 which is clocked by the negative-going edge of the clock signal. The outputs from the quad registers 48, 50 and hex flip-flop 52 are provided to the programmable array logic (PAL) 54. From FIG. 2, it can be seen that the Q0, Q10, Q30, Q40, Q60, and Q70 inputs thereto are clocked by the positive-going edge of the clock input to the quad registers 48, 50. Similarly, the Q5, Q15, Q25, Q35, Q55, and Q65 inputs to the programmable array logic 54 are clocked by the negative-going edge of the clock signal provided to hex flip-flop 52.

As thus far described, the timing signals provided to the edge-responsive programmable array logic 54 are generated by the combination of quad registers 48, 50 and hex flip-flop 52. The programmable array logic 54 is thus responsive to the input signals provided during a first clocking period DOTCLK corresponding to the non-inverted clock signal and is also responsive to clocking signals provided during a second timing interval corresponding to the inverted clocking signal $\overline{\text{DOTCLK}}$. The programmable array logic 54 includes a plurality of AND, OR, etc., logic gates which are programmably activated in a conventional manner. The programmable array logic utilized in a preferred embodiment of the present invention is the PAL14L4 which is a member of the PAL integrated circuit family manufactured by Monolithic Memories of Sunnyvale, Calif. This programmable array logic 54 utilizes a Schottky TTL process and bipolar programmable Read Only Memory fusible link technology to provide user programmable logic for carrying out desired digital functions. The programmable array logic 54 includes a programmable AND array driving a fixed NOR array wherein product terms with all fuses blown assume the logical high state, and the product terms connected to both the true and complement of any single input assume the logical low state. The programmable array logic 54 thus utilized in a preferred embodiment of the present invention is an off-the-shelf item which may be selectively configured by means of a commercially available program to perform the unique functions required in the present invention. The program utilized for programming the PAL 54 as configured in a preferred embodiment of the present invention is shown in Table I.

TABLE I

```
PAL14L4      ACTIVE LOW ADMUX
PAT0003
VIDEO RAM CONTROLLER
Q0 Q05 Q10 Q15 Q25 Q30 Q35 Q40 Q55 GND
Q60 Q65 Q70 RAS CAS ADMUX VIDSTRB VIDRAMSEL A VCC
RAS = /Q30*Q55 + Q05*/Q30 + Q0*Q60 + Q25*/Q70*/VIDRAMSEL
CAS = /Q40*Q65 + Q15*/Q40 + Q70*Q10 + Q0*Q30*/VIDRAMSEL
ADMUX = /Q05*Q30 + /Q60*/Q05 + Q35*/Q60*VIDRAMSEL
VIDSTRB = /Q15*Q35 + Q0*/Q10
PAL14L4      ACTIVE LOW ADMUX
PAT0003
VIDEO RAM CONTROLLER
Number of fuses blown = 335
```

| | 0123 | 4567 | 11<br>8901 | 1111<br>2345 | 1111<br>6789 | 2222<br>0123 | 2222<br>4567 | 2233<br>8901 |
|---|---|---|---|---|---|---|---|---|
| 0 | 0000 | 0000 | 0000 | 0000 | 0000 | 0000 | 0000 | 0000 |
| 1 | 0000 | 0000 | 0000 | 0000 | 0000 | 0000 | 0000 | 0000 |
| 2 | 0000 | 0000 | 0000 | 0000 | 0000 | 0000 | 0000 | 0000 |
| 3 | 0000 | 0000 | 0000 | 0000 | 0000 | 0000 | 0000 | 0000 |
| 4 | 0000 | 0000 | 0000 | 0000 | 0000 | 0000 | 0000 | 0000 |
| 5 | 0000 | 0000 | 0000 | 0000 | 0000 | 0000 | 0000 | 0000 |
| 6 | 0000 | 0000 | 0000 | 0000 | 0000 | 0000 | 0000 | 0000 |
| 7 | 0000 | 0000 | 0000 | 0000 | 0000 | 0000 | 0000 | 0000 |
| 8 | 0000 | 0000 | 0000 | 0000 | 0000 | 0000 | 0000 | 0000 |
| 9 | 0000 | 0000 | 0000 | 0000 | 0000 | 0000 | 0000 | 0000 |
| 10 | 0000 | 0000 | 0000 | 0000 | 0000 | 0000 | 0000 | 0000 |
| 11 | 0000 | 0000 | 0000 | 0000 | 0000 | 0000 | 0000 | 0000 |
| 12 | 0000 | 0000 | 0000 | 0000 | 0000 | 0000 | 0000 | 0000 |
| 13 | 0000 | 0000 | 0000 | 0000 | 0000 | 0000 | 0000 | 0000 |
| 14 | 0000 | 0000 | 0000 | 0000 | 0000 | 0000 | 0000 | 0000 |
| 15 | 0000 | 0000 | 0000 | 0000 | 0000 | 0000 | 0000 | 0000 |
| 16 | ---- | ---- | -X-- | --OO | --OO | X--- | ---- | ---- |
| 17 | --X- | -X-- | ---- | --OO | --OO | ---- | ---- | ---- |
| 18 | XXXX | XXXX | XXXX | XXOO | XXOO | XXXX | XXXX | XXXX |
| 19 | XXXX | XXXX | XXXX | XXOO | XXOO | XXXX | XXXX | XXXX |
| 20 | 0000 | 0000 | 0000 | 0000 | 0000 | 0000 | 0000 | 0000 |
| 21 | 0000 | 0000 | 0000 | 0000 | 0000 | 0000 | 0000 | 0000 |
| 22 | 0000 | 0000 | 0000 | 0000 | 0000 | 0000 | 0000 | 0000 |
| 23 | 0000 | 0000 | 0000 | 0000 | 0000 | 0000 | 0000 | 0000 |
| 24 | -X-- | ---- | ---- | --OO | X-OO | ---- | ---- | ---- |
| 25 | -X-- | ---- | ---- | --OO | --OO | ---- | ---- | ---X |
| 26 | ---- | ---- | --X- | --OO | --OO | X--- | ---- | ---X |
| 27 | XXXX | XXXX | XXXX | XXOO | XXOO | XXXX | XXXX | XXXX |
| 28 | 0000 | 0000 | 0000 | 0000 | 0000 | 0000 | 0000 | 0000 |
| 29 | 0000 | 0000 | 0000 | 0000 | 0000 | 0000 | 0000 | 0000 |
| 30 | 0000 | 0000 | 0000 | 0000 | 0000 | 0000 | 0000 | 0000 |
| 31 | 0000 | 0000 | 0000 | 0000 | 0000 | 0000 | 0000 | 0000 |

TABLE I-continued

PAL14L4 ACTIVE LOW ADMUX
PAT0003
VIDEO RAM CONTROLLER
Q0 Q05 Q10 Q15 Q25 Q30 Q35 Q40 Q55 GND
Q60 Q65 Q70 RAS CAS ADMUX VIDSTRB VIDRAMSEL A VCC
RAS = /Q30*Q55 + Q05*/Q30 + Q0*Q60 + Q25*/Q70*/VIDRAMSEL
CAS = /Q40*Q65 + Q15*/Q40 + Q70*Q10 + Q0*Q30*/VIDRAMSEL
ADMUX = /Q05*Q30 + /Q60*/Q05 + Q35*/Q60*VIDRAMSEL
VIDSTRB = /Q15*Q35 + Q0*/Q10
PAL14L4 ACTIVE LOW ADMUX
PAT0003
VIDEO RAM CONTROLLER
Number of fuses blown = 335

| | | | 11 | 1111 | 1111 | 2222 | 2222 | 2233 |
|---|---|---|---|---|---|---|---|---|
| | 0123 | 4567 | 8901 | 2345 | 6789 | 0123 | 4567 | 8901 |
| 32 | ---- | ---- | ---- | --OO | --OO | ---- | -XX- | ---- |
| 33 | ---- | ---- | X--- | --OO | --OO | ---- | -X-- | ---- |
| 34 | ---- | X--- | ---- | --OO | --OO | --X- | ---- | ---- |
| 35 | --X- | ---- | ---X | --OO | X-OO | ---- | ---- | ---- |
| 36 | 0000 | 0000 | 0000 | 0000 | 0000 | 0000 | 0000 | 0000 |
| 37 | 0000 | 0000 | 0000 | 0000 | 0000 | 0000 | 0000 | 0000 |
| 38 | 0000 | 0000 | 0000 | 0000 | 0000 | 0000 | 0000 | 0000 |
| 39 | 0000 | 0000 | 0000 | 0000 | 0000 | 0000 | 0000 | 0000 |
| 40 | ---- | ---- | ---- | --OO | -XOO | ---- | ---- | X--- |
| 41 | X--- | ---- | ---- | --OO | -XOO | ---- | ---- | ---- |
| 42 | --X- | ---- | ---- | --OO | --OO | ---- | ---- | --X- |
| 43 | ---- | ---- | ---X | X-OO | --OO | ---X | ---- | ---- |
| 44 | 0000 | 0000 | 0000 | 0000 | 0000 | 0000 | 0000 | 0000 |
| 45 | 0000 | 0000 | 0000 | 0000 | 0000 | 0000 | 0000 | 0000 |
| 46 | 0000 | 0000 | 0000 | 0000 | 0000 | 0000 | 0000 | 0000 |
| 47 | 0000 | 0000 | 0000 | 0000 | 0000 | 0000 | 0000 | 0000 |
| 48 | 0000 | 0000 | 0000 | 0000 | 0000 | 0000 | 0000 | 0000 |
| 49 | 0000 | 0000 | 0000 | 0000 | 0000 | 0000 | 0000 | 0000 |
| 50 | 0000 | 0000 | 0000 | 0000 | 0000 | 0000 | 0000 | 0000 |
| 51 | 0000 | 0000 | 0000 | 0000 | 0000 | 0000 | 0000 | 0000 |
| 52 | 0000 | 0000 | 0000 | 0000 | 0000 | 0000 | 0000 | 0000 |
| 53 | 0000 | 0000 | 0000 | 0000 | 0000 | 0000 | 0000 | 0000 |
| 54 | 0000 | 0000 | 0000 | 0000 | 0000 | 0000 | 0000 | 0000 |
| 55 | 0000 | 0000 | 0000 | 0000 | 0000 | 0000 | 0000 | 0000 |
| 56 | 0000 | 0000 | 0000 | 0000 | 0000 | 0000 | 0000 | 0000 |
| 57 | 0000 | 0000 | 0000 | 0000 | 0000 | 0000 | 0000 | 0000 |
| 58 | 0000 | 0000 | 0000 | 0000 | 0000 | 0000 | 0000 | 0000 |
| 59 | 0000 | 0000 | 0000 | 0000 | 0000 | 0000 | 0000 | 0000 |
| 60 | 0000 | 0000 | 0000 | 0000 | 0000 | 0000 | 0000 | 0000 |
| 61 | 0000 | 0000 | 0000 | 0000 | 0000 | 0000 | 0000 | 0000 |
| 62 | 0000 | 0000 | 0000 | 0000 | 0000 | 0000 | 0000 | 0000 |
| 63 | 0000 | 0000 | 0000 | 0000 | 0000 | 0000 | 0000 | 0000 |

X = Fuse intact (L,N,0)
0 = Phantom fuse (L,N,0)
- = Fuse blown (H,P,1)
O = Phantom fuse (H,P,1)

Referring to the upper portion of Table I, the various input signals to and output signals from the programmable array logic 54 are indicated. The input signals are Q0, Q5, Q10, Q15, Q25, Q30, Q35, Q40, Q55, Q60, Q65, Q70, and VIDRAMSEL. The VIDRAMSEL signal is provided from the active low AND gate 40 and indicates to the programmable array logic 54 that the CPU seeks access to the video RAM array 14 via the data OUT bus 17, the CPU latch 12, and the CPU data IN bus 15. The algorithms utilized in programming the programmable array logic 54 for generating the various output signals are shown at the top of Table I. The four output signals generated by the programmable array logic 54 in response to the various inputs are the video strobe signal (VIDSTRB), the address multiplexer signal (ADMUX), the row address strobe (RAS), and the column address strobe (CAS). The ADMUX signal is provided to the address multiplexer 27 for multiplexing row and column addresses (RAS and CAS) to the video RAM array 14. In the algorithms at the top of Table I, a star represents an AND function, a "+" represents a NOR operation, and a "/" represents the inverted state of the signal indicated. For example, in the generation of the VIDSTRB signal, the programmable array logic 54, which is an active low output device, AND's the inverted state of the Q15 input with the Q35 input and similarly AND's the Q0 input with an inverted Q10 input signal. This produces two output signals which are NORed to produce the VIDSTRB signal. The VIDSTRB signal is then provided to the video latch 18.

Figure 3:
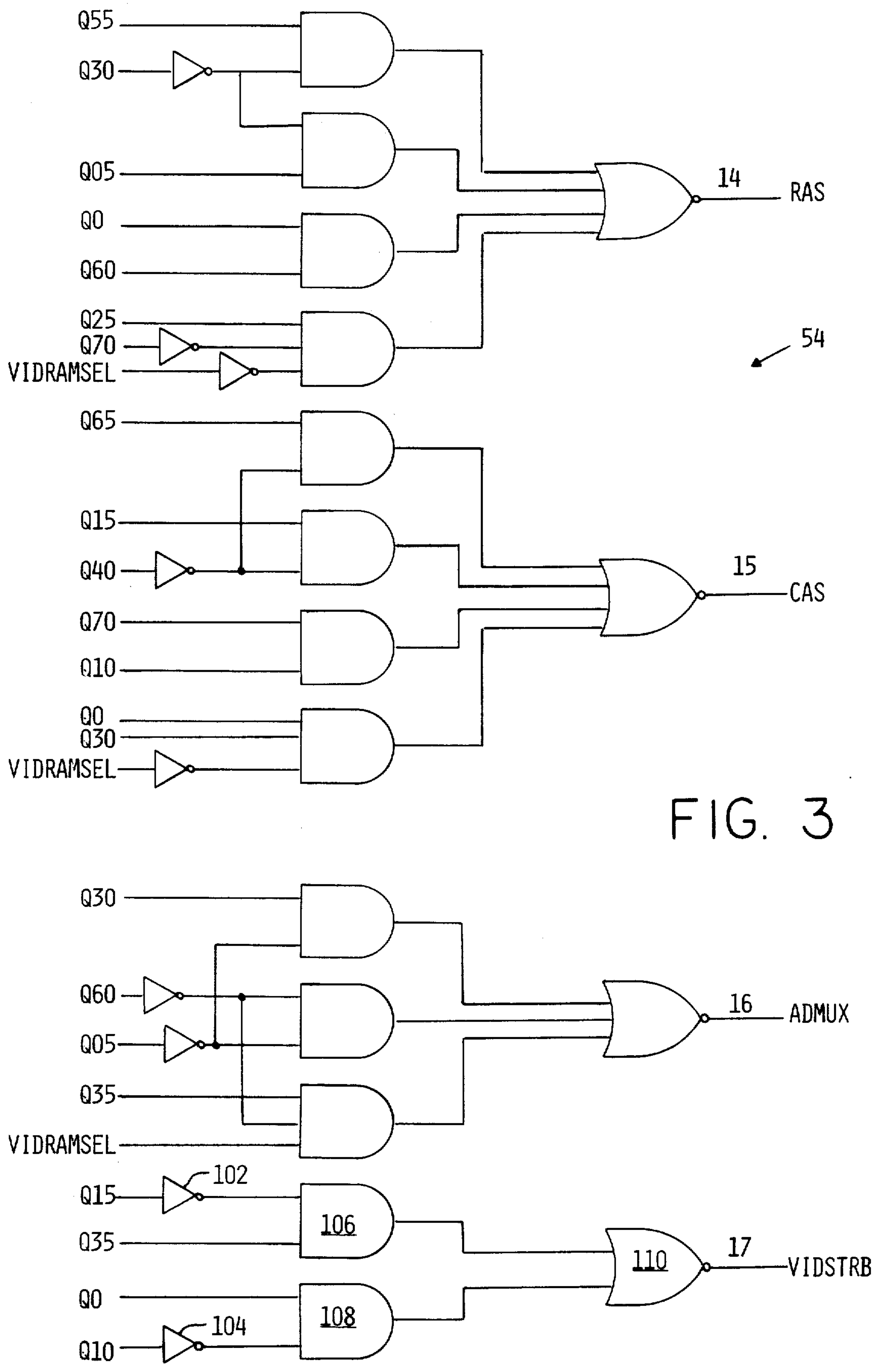
FIG. 3 is a logic diagram showing the generation and processing of various timing and control signals utilized in the present invention.

FIG. 3 shows the logic organization of the programmable array logic 54, with the aforementioned logic functions performed in generating the VIDSTRB signal indicated at the bottom portion thereof. For example, signal inversion is performed by inverters 102, 104, with the thus inverted signals ANDed respectively with the Q35 and Q0 input signals in AND gates 106, 108. The outputs of these AND gates are then NORed in gate 110 to produce the VIDSTRB signal. FIG. 3 also includes logic circuitry employed in generating the RAS, CAS, and the ADMUX signals. Since this logic signal processing scheme is of conventional design and does not form a part of the present invention, it will not be discussed in greater detail.

Figure 4:
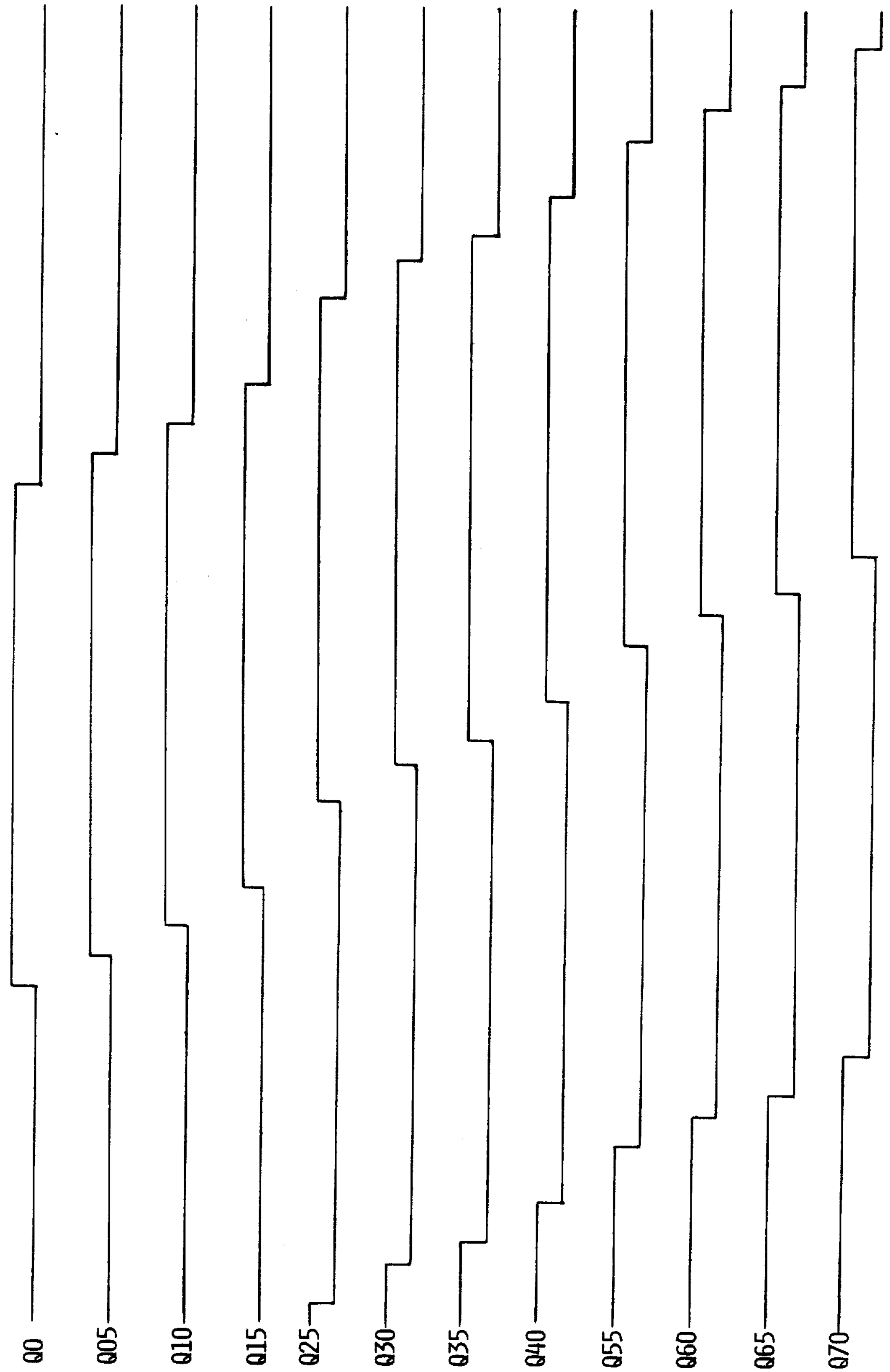
FIG. 4 is a timing diagram showing the relationship of the input signals provided to the programmable array logic of FIG. 3.
Figure 5:
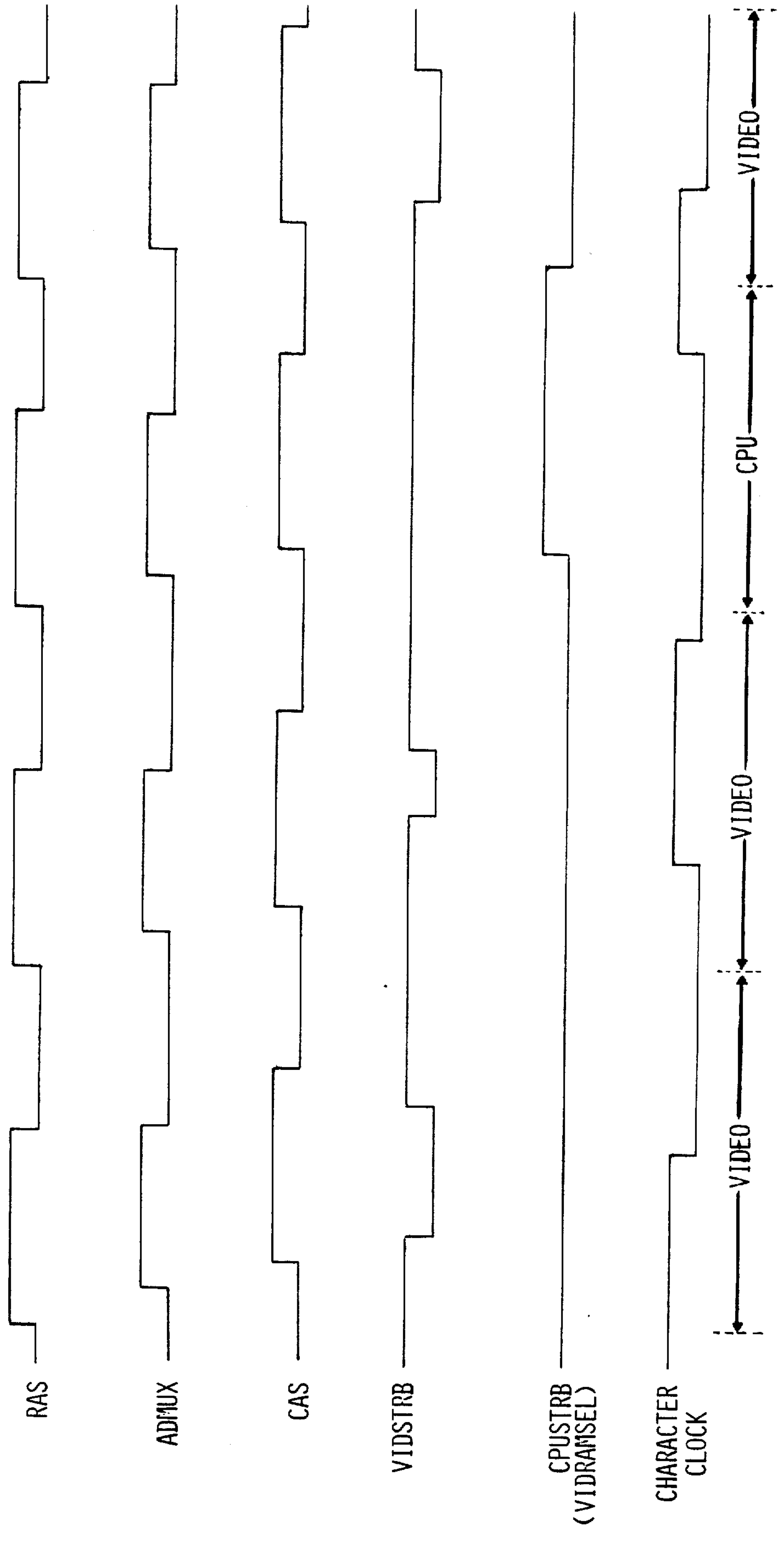
FIG. 5 is a timing diagram showing the relationship of the output signals of the programmable array logic of FIG. 3 and how they relate to the video RAM array accessing sequence of the present invention.

Referring to FIG. 4, there is shown the relative timing of the input signals provided to the programmable array logic 54. In referring to FIG. 4, the timing of the input signals Q15, Q65 should be particularly noted since these signals are provided not only to the programmable array logic 54, but also to the clock inputs of flip-flops 36 and 38, respectively. Shown in FIG. 5 is a timing diagram of the various output signals generated by the programmable array logic 54 and the relationship between CPU and CRT controller access times with the video RAM array with respect to the timing of the aforementioned signals. In addition, the signal waveforms of FIGS. 4 and 5 are drawn with respect to the same time base line on the left-hand portion of each of these signal waveforms. In FIG. 5, the RAS and CAS signals shown are active high. Thus, from FIGS. 4 and 5, it can be seen that the rising edge of the Q15 signal provided to the clock input of flip-flop 36 triggers the VIDRAMSEL output signal of the active low AND gate 40. Similarly, the Q65 signal, which is also provided to the programmable array logic 54, is also provided to the clock input of flip-flop 38 such that when flip-flop 38 receives a clock input, and its Q output transitions from low to high, the output of the active low AND gate 40 transitions from high to low and the VIDRAMSEL signal is in a logic low state. Thus, if the output of active low AND gate 32 goes high and is timed into the D-input of flip-flop 36 before the Q15 clock input thereto transitions from low to high, the $\overline{\text{CRTRAMSEL}}$ signal will be clocked into the arbitration logic circuitry 24 resulting in the generation of the VIDRAMSEL signal for providing CPU access to the video RAM array 14. If the output of AND gate 32 is not clocked into flip-flop 36 before the arrival of a low to high transition of the Q15 input thereto, the VIDRAMSEL signal is not generated and provided to the CPU latch 12 and CPU 10 must await the next sequential CPU access cycle before accessing the video RAM array.

Referring to FIG. 5, CPU-video RAM array access periods are designated by "CPU" while CRT controller-video RAM array access times are designated by "VIDEO" shown at the bottom portion thereof. The CRT controller 16 operates on the basis of the inputs from a character clock which is represented by the bottommost signal waveform in FIG. 5. The falling edge of the character clock signal initiates the readout by the CRT controller 16 of the memory address location from which data is to be provided to the video latch 18, the video logic 20 and thence to the CRT 22 for the presentation of video information thereon. Following the occurrence of the falling edge of the character clock signal, the contents of the designated memory address are read from the video RAM array 14 and provided to the video latch 18. The RAS and CAS signals are necessary for the operation of the dynamic RAM utilized as the video RAM array 14 of the present invention. In actual practice, inverted RAS and CAS signals ($\overline{\text{RAS}}$ and $\overline{\text{CAS}}$, respectively) are generated by conventional means such as RAM driver circuits (not shown) and are provided to the video RAM array 14 for the operation thereof. The start of a $\overline{\text{RAS}}$ signal represents the start of a memory access cycle wherein the falling edge of the $\overline{\text{RAS}}$ signal initiates the latching of the appropriate row address information into the video RAM array 14. Similarly, the falling edge of the $\overline{\text{CAS}}$ signal initiates the reading of appropriate column addressing information into the video RAM array 14. Since in the present invention a 64K dynamic RAM is used as the video RAM array 14, 16-bits of address are provided thereto by the CRT controller 16. Since the dynamic RAM includes only 8 input pins, the 16-bits of information must be multiplexed onto these input pins and this is accomplished by means of the ADMUX signal which multiplexes these 16-bits of information onto the 8 input pins of the video RAM array 14.

CPU latch 12 is latched by a level-sensitive signal whereas video latch 18 is an edge-triggered device. The RAS signal initiates the start of a RAM array accessing cycle. The RAS signal is followed by the CAS signal, with the ADMUX signal interposed therebetween for properly sequencing these signals into the video RAM array. The RAS and CAS signals provide the proper addressing information to the video RAM array 14 in providing selected video information to the CRT 22. From FIG. 5, it can be seen that two consecutive CRT controller accessing cycles occur wherein the aforementioned video information is provided to the video latch 18. Actual transfer of the data to the video latch 18 is initiated by the VIDSTRB signal shown in FIG. 5. The rising edge of the VIDSTRB signal latches the video information read from the video RAM array 14 into the video latch 18 for driving the CRT 22. Two VIDSTRB signal pulses occur before the occurrence of a CPUSTRB signal. Thus, two CRT controller accessing cycles occur before a CPU access cycle is initiated. The CPUSTRB signal performs a function similar to that of the VIDSTRB signal by initiating the latching of the addressed contents of the video RAM array 14 into the CPU latch 12. In actuality, the VIDRAMSEL AND CPUSTRB signals are one and the same. If the VIDRAMSEL/CPUSTRB signal is not generated indicating that the CPU does not seek video RAM array access, two consecutive CRT controller accessing cycles will occur, followed by a gap during which CPU access would have been provided if desired, followed by two more, consecutive CRT controller accessing cycles. This procedure will continue until the CPU seeks video RAM array access.

The appropriate information is temporarily stored in either the CPU latch 12 or the video latch 18 in response to either the CPUSTRB signal or the VIDSTRB signal provided respectively thereto. Once video information is temporarily stored in the video latch 18, a data transfer process is initiated in which the 8-bits of video information are loaded into a shift register (not shown) and then sequentially transferred out of the video latch 18 into the video logic circuitry 20 for driving the CRT 22. As the information from the first cycle is transferred out of the video latch 18, the video information from the second accessing cycle of the CRT controller 16 is latched into the video latch circuit 18. This sequential process occurs for at least two consecutive video RAM array accessing cycles, or until the VIDRAMSEL signal goes high indicating to the CPU latch 12 that the CPU seeks to access the video RAM array 14.

There has thus been described a unique approach to resolving the contention in a data processing system between the accessing of a video memory array therein by the system's CPU and CRT controller. The present invention maximizes CRT controller access to the video memory array in insuring high quality graphics presentation on the system's display unit. Accessing contention priority is provided to the CRT controller with CPU access available only when required during normal system operation.

While particular embodiments of the present invention have been shown and described, it will be apparent to those skilled in the art that changes and modifications may be made therein without departing from the invention in its broader aspects. The aim in the appended claims, therefore, is to cover all such changes and modifications as fall within the true spirit and scope of the invention.

I claim:

1. In a data processing system including a central processing unit, video memory means characterized as having first and second modes of operation and including a plurality of addressable memory locations for storing central processing unit instructions, display instructions, and display graphics information, a raster scanned display unit for presenting said display graphics information thereon in accordance with said display instructions, and a controller unit responsive to said display instructions and said display graphics information for generating video drive signals for said display unit in presenting said display graphics information in accordance with said display instructions, wherein said video memory means is successively accessed by said central processing unit during a control cycle by means of a first data bus and a central processing unit latch during a central processing unit control cycle in response to an access request signal for writing said central processing unit instructions therein and reading said display instructions and display graphics information therefrom in said first mode of operation and is accessed by said controller unit by means of a second data bus and a video latch during a video processing cycle for reading said display instructions and display graphics information therefrom in driving said display unit in accordance therewith in said second mode of operation, a system for controlling the access of said video memory means by said central processing unit and said controller unit comprising:

first means responsive to the first mode of operation of said video memory means and further responsive to said access request signal for generating a first control signal in response thereto;

timing means responsive to the start of a video processing cycle for generating a second control signal equal in duration to two video processing cycles;

logic means coupled to said video memory means and to said video latch, and further coupled to said first means and to said timing means and responsive to said first and second control signals respectively output therefrom for generating a video strobe signal and a memory access signal, wherein said memory access signal is provided to said video memory means for initiating a video processing cycle and said video strobe signal is provided to said video latch for coupling said controller to said video memory means for two successive video processing cycles; and conducting means coupling said first means to said central processing unit latch for providing said first control signal thereto in initiating a control cycle wherein said central processing unit accesses said video memory means following said two successive video processing cycles.

2. The system of claim 1 wherein each of said control and video processing cycles are of equal duration.

3. The system of claim 1 further including multiplexing means coupling said video memory means to said central processing unit and to said controller unit, said multiplexing means further coupled to said logic means and responsive to a third control signal output therefrom for successively coupling said central processing unit and said controller unit to said video memory means during respective control and video processing cycles.

4. The system of claim 1 wherein said raster scanned display unit includes a cathode ray tube responsive to said video drive signals from said controller unit with said display graphics information stored sequentially in a plurality of addressable storage locations in said video memory means, each storage location representing a discrete picture element of said cathode ray tube, and wherein said display graphics information is read from said video memory means by said controller unit in synchronism with the raster scanning of said cathode ray tube.

5. The system of claim 4 wherein the central processing unit is coupled to said video memory means in a central processing unit control cycle during a vertical retrace interval of said cathode ray tube.

6. The system of claim 5 wherein said video memory means includes a dynamic random access memory circuit and said memory access signal includes row and column address signals, with said row and column address signals provided to said dynamic random access memory circuit in accordance with said display graphics information.

7. The system of claim 6 further including a multiplexer circuit coupling said logic means to said dynamic random access memory circuit for sequentially and in an alternating manner providing said row and column address signals to said dynamic random access memory circuit.

8. The system of claim 4 wherein said timing means generates a third control signal for controlling the on/-off cycles of said cathode ray tube in generating the discrete picture elements of said cathode ray tube.

* * * * *